United States Patent [19]

Hibi

[11] Patent Number: 5,230,670
[45] Date of Patent: Jul. 27, 1993

[54] FRICTION ROLLER TYPE CONTINUOUSLY VARIABLE TRANSMISSION

[75] Inventor: Toshifumi Hibi, Kanagawa, Japan

[73] Assignee: Nissan Motor Co., Ltd., Yokohama, Japan

[21] Appl. No.: 788,232

[22] Filed: Nov. 5, 1991

[30] Foreign Application Priority Data

Dec. 25, 1990 [JP] Japan .................. 2-418418

[51] Int. Cl.⁵ ............................................ F16H 37/00
[52] U.S. Cl. .................................. 475/214; 475/215; 475/216; 476/42
[58] Field of Search .................... 74/194, 198, 199; 475/214, 215, 216

[56] References Cited

U.S. PATENT DOCUMENTS

| | | | |
|---|---|---|---|
| 2,140,012 | 12/1938 | Hayes | 475/214 X |
| 3,684,065 | 8/1972 | Scheiter | 475/216 X |
| 3,713,353 | 1/1973 | Scheiter | 475/214 X |
| 3,739,658 | 6/1973 | Scheiter | 475/214 X |
| 4,922,788 | 5/1990 | Greenwood | 475/216 X |

FOREIGN PATENT DOCUMENTS 2-163553 6/1990 Japan .

OTHER PUBLICATIONS

Gear Drive Systems, chapter 7, pp. 296 and 297, Peter Lynwander, 1983.

Primary Examiner—Leslie A. Braun
Assistant Examiner—Daniel Wittels
Attorney, Agent, or Firm—Foley & Lardner

[57]. ABSTRACT

A continuously variable transmission is disclosed which comprises a torque transmitting device to which an engine torque is applied, the torque transmitting device being coaxially arranged on a first axis; a planetary gear mechanism to which a torque from the torque transmitting device is applied, the planetary gear mechanism being coaxially arranged on the first axis; a continuously variable type speed change device to which a torque from the planetary gear mechanism is applied, the speed change device being coaxially arranged on the first axis; an output shaft coaxially arranged on the first axis; a countershaft coaxially arranged on a second axis which is in parallel with the first axis; first gears for transmitting a torque from the speed change device to the countershaft; and second gears for transmitting a torque from the countershaft to the output shaft. The planetary gear mechanism is so arranged as to lower the torque applied thereto and transmit the lowered torque to the speed change device.

8 Claims, 2 Drawing Sheets

FRICTION ROLLER TYPE CONTINUOUSLY VARIABLE TRANSMISSION

BACKGROUND OF THE INVENTION

1. Field of the Invention

The present invention relates in general to continuously variable transmissions, and more particularly, to continuously variable transmissions of a friction roller type.

2. Description of the Prior Art

Japanese Patent First Provisional Publication No. 2-163553 shows one conventional continuously variable transmission of the above-mentioned type. The transmission shown in this publication comprises generally a torque converter, a lock-up clutch, a forward/reverse movement switching device, a toroidal disc type speed change device, a countershaft and an output shaft. These parts except the countershaft are arranged on a common axis, and the countershaft is arranged in parallel with the common axis. Torque from an engine is transmitted through the torque converter (or the lock-up clutch), the forward/reverse movement switching device, the toroidal disc type speed change device and the countershaft to the output shaft. Between the speed change device and the countershaft, there are arranged two constantly engaged gears, and between the countershaft and the output shaft, there are arranged three constantly engaged gears including one idler gear. The idler gear is employed for matching the rotation direction of the output shaft with that of the engine.

SEA Paper 751180 shows in FIG. 7 another conventional continuously variable transmission of such type. The transmission comprises generally a hydraulic clutch, an input shaft on which the clutch is coaxially arranged, a toroidal disc type speed change device, a planetary reduction gear and an output shaft. These parts except the hydraulic clutch and the input shaft are arranged on a common axis, and the hydraulic clutch and the input shaft are arranged in parallel with the common axis. This means that the output shaft is arranged offset to the input shaft. Between the input shaft and the speed change device, there are arranged two constantly engaged gears. These two gears are so designed as to increase the speed of rotation applied to the speed change device. Thus, the torque applied to the speed change device is lowered.

Due to their inherent constructions, the above-mentioned two transmissions have the following drawbacks.

That is, in the transmission of Japanese Patent First Provisional Publication No. 2-163553, the engine torque is substantially directly inputted to the toroidal disc type speed change device through the torque converter or the lock-up clutch. This means increasing the torque receiving capacity of the speed change device and thus brings about enlargement in size of the transmission. Furthermore, usage of the three gears between the countershaft and the output shaft promotes the size enlargement.

In the transmission of the SAE Paper, so-called "torque lowering gears" are arranged upstream of the speed change device for lowering the torque applied to the same. Thus, one of the drawbacks encountered in the former transmission is solved. However, in the latter transmission, the input shaft and the output shaft are arranged offset to each other. This means that the size of the transmission is inevitably increased by a degree corresponding to the offset.

SUMMARY OF THE INVENTION

It is therefore an object of the present invention to provide a friction roller type continuously variable transmission which is free of the above-mentioned drawbacks.

According to the present invention, there is provided a friction roller type continuously variable transmission which is compact in size.

According to the present invention, there is further provided a friction roller type continuously variable transmission in which a torque transmission from a countershaft to an output shaft is effected by two meshed gears.

According to the present invention, there is provided a continuously variable transmission which comprises torque transmitting means to which an engine torque is applied, the torque transmitting means being coaxially arranged on a first axis; a planetary gear mechanism to which a torque from the torque transmitting means is applied, the planetary gear mechanism being coaxially arranged on the first axis; a continuously variable type speed change device to which a torque from the planetary gear mechanism is applied, the speed change device being coaxially arranged on the first axis; an output shaft coaxially arranged on the first axis; a countershaft coaxially arranged on a second axis which is in parallel with the first axis; first gear means for transmitting a torque from the speed change device to the countershaft; and second gear means for transmitting a torque from the countershaft to the output shaft, wherein the planetary gear mechanism is so arranged as to lower the torque applied thereto and transmit the lowered torque to the speed change device.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
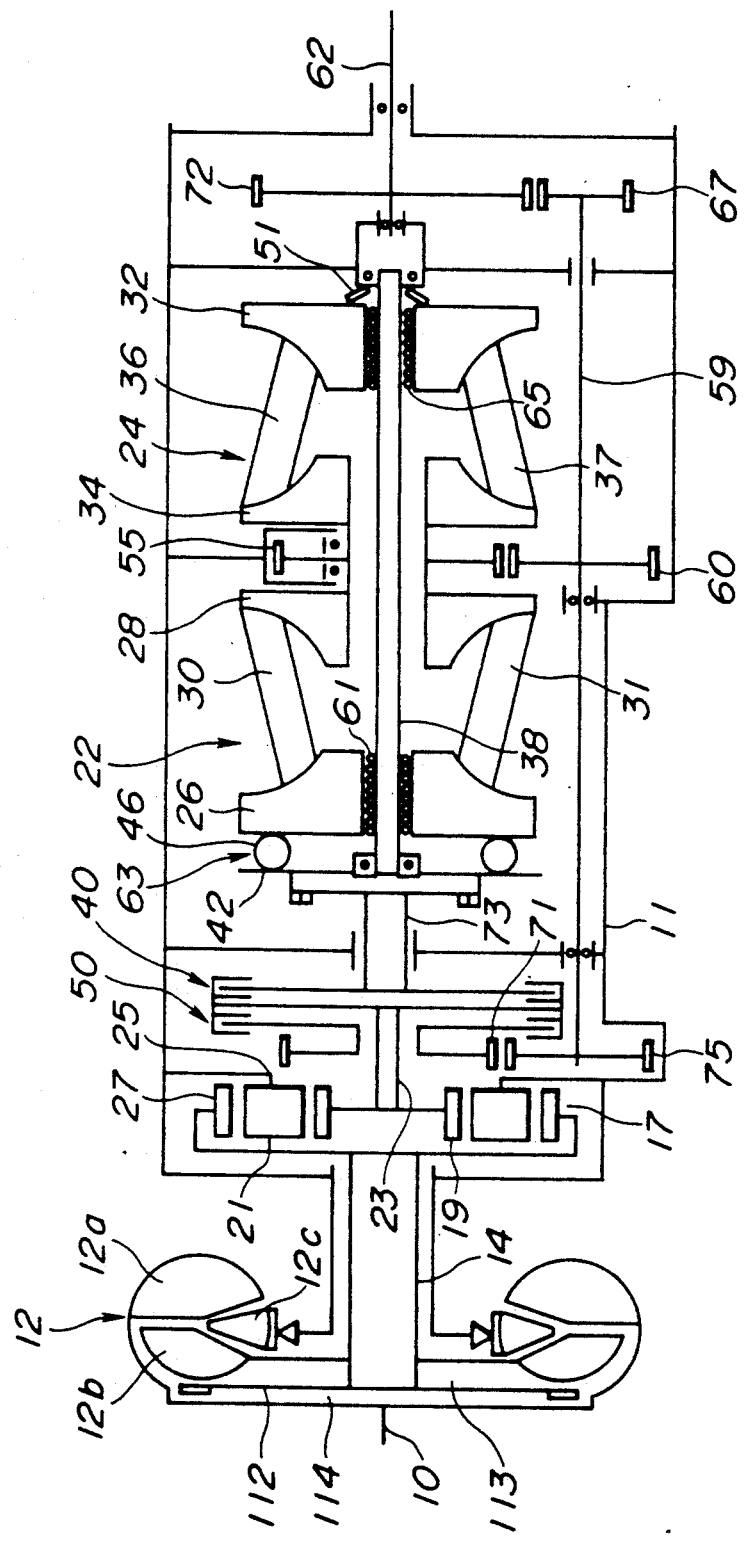
FIG. 1 is a schematic view of a continuously variable transmission of a first embodiment of the present invention.

Referring to FIG. 1 of the drawings, there is shown a continuously variable transmission of a first embodiment of the present invention.

A torque from an engine crank shaft 10 is applied to a torque converter 12 or a lock-up clutch 112.

As is known, the torque converter 12 comprises a pump impeller 12a, a turbine runner 12b and a stator 12c.

In accordance with a pressure difference between an apply-side hydraulic chamber 113 and a release-side hydraulic chamber 114, the lock-up clutch 112 can selectively engage and disengage the pump impeller 12a with and from the turbine runner 12b.

A turbine shaft 14 integral with the turbine runner 12b is connected to an internal gear 27 of a planetary gear mechanism 17. The planetary gear mechanism 17 comprises a sun gear 19, pinion gears 21 held by a pinion carrier 25, and the internal gear 27. Each pinion gear 21 is meshed with both the internal gear 27 and the sun gear 19. The sun gear 19 has a shaft 23 coaxially connected thereto. The pinion carrier 25 is connected to a casing 11.

Coaxially connected to the shaft 23 are forward and reverse clutches 40 and 52. The forward clutch 40 can connect the shaft 23 with a coaxial shaft 73, while, the reverse clutch 50 can connect the shaft 23 with a reverse drive gear 71.

Within the casing 11 at a position downstream of the forward clutch 40, there are coaxially installed a first speed change mechanism 22 and a second speed change mechanism 24.

The first speed change mechanism 22 comprises an input disc 26, an output disc 28 and a pair of friction rollers 30 and 31 each being operatively interposed between the input and output discs 26 and 28. The input and output discs 26 and 28 have toroidal surfaces to which convex peripheries of the friction rollers 30 and 31 contact. By changing the angular position of each friction roller 30 or 31 relative to the input and output discs 26 and 28, the rotation speed change ratio between the input and output discs 26 and 28 is infinitely varied.

Similar to the first speed change mechanism 22, the second speed change mechanism 24 comprises an input disc 32, an output disc 34 and a pair of friction rollers 36 and 37 each being operatively interposed between the input and output discs 32 and 34. However, as is understood from the drawing, the arrangement of the input and output discs 32 and 34 of this second speed change mechanism 24 is opposite to that of the above-mentioned first speed change mechanism 22. That is, the output disc 28 of the first speed change mechanism 22 and the output disc 34 of the second speed change mechanism 24 are positioned close to each other.

The input disc 26 of the first speed change mechanism 22 is disposed through ball-splines 61 on a shaft 38 which is coaxially connected to the shaft 73. A cam flange 42 is arranged at a back side of the input disc 26. Between facing cam surfaces of the cam flange 42 and input disc 26, there are operatively disposed cam rollers 46. The cam rollers 46 are so shaped and arranged that, when the input disc 26 and the cam flange 42 make a relative rotation, the input disc 26 is biased toward the output disc 28. That is, the cam flange 42, the input disc 26 and the cam rollers 46 constitute a loading cam 63.

The input disc 32 of the second speed change mechanism 24 is disposed through ball-splines 65 on the shaft 38. The input disc 32 is constantly biased toward the output disc 34 by a disc spring 51.

The output disc 28 of the first speed change mechanism 22 and the output disc 34 of the second speed change mechanism 24 are rotatably disposed about the shaft 38.

A forward drive gear 55 is provided between the two output discs 28 and 34 and rotates together with them.

The forward drive gear 55 is meshed with a forward driven gear 60 which is securedly disposed on a countershaft 59.

The countershaft 59 is arranged in parallel with the shaft 38. The countershaft 59 has at its front end a reverse driven gear 75 secured thereto and at its rear end an output drive gear 67 secured thereto. The reverse driven gear 75 is meshed with the above-mentioned reverse drive gear 71, and the output drive gear 67 is meshed with an output driven gear 72 which rotates together with an output shaft 62.

As is seen from the drawing, the turbine shaft 14, the shaft 23, the shaft 73, the shaft 38 and the output shaft 62 are arranged on a common axis.

In the following, operation of the first embodiment will be described.

For ease of understanding, the description will be commenced with respect to a forward drive condition wherein the forward clutch 40 is engaged and the reverse clutch 50 is disengaged.

Under this condition, the engine torque from the crank shaft 10 is transmitted through the torque converter 12 (or the lock-up clutch 112) and the turbine shaft 14 to the planetary gear mechanism 17. Upon this, the mechanism 17 rotates the shaft 23 in an opposite direction at a speed higher than the turbine shaft 14. The rotation of the shaft 23 is transmitted through the engaged forward clutch 40, the shaft 73 and the shaft 38 to the first and second speed change mechanisms 22 and 24. By these mechanisms 22 and 24, the rotation is subjected to a speed change and outputted to the forward drive gear 55. The rotation of the forward drive gear 55 is transmitted through the forward driven gear 60 to the countershaft 59 and then through the engaged output drive and driven gears 67 and 72 to the output shaft 62. The rotation of the output shaft 62 drives the associated motor vehicle in a forward direction at a desired speed.

It is now to be noted that the engine torque is lowered by the planetary gear mechanism 17 before being inputted to the first and second speed change mechanisms 22 and 24. That is, the planetary gear mechanism 17 serves as a so-called "torque lowering means". Thus, there is no need of increasing the torque receiving capacity of the first and second speed change mechanisms 22 and 24, unlike the case of the afore-mentioned former conventional transmission. Furthermore, provision of the planetary gear mechanism 17 induces no need of using an idler gear between the output drive and driven gears 67 and 72.

In a reverse drive condition, the forward clutch 40 is disengaged and the reverse clutch 50 is engaged.

Under this reverse drive condition, the engine torque from the crank shaft 10 is transmitted through the torque converter 12, the turbine shaft 14, the planetary gear mechanism 17, the shaft 23, the reverse clutch 50, the reverse drive gear 71, the reverse driven gear 75, the countershaft 59, the output drive gear 67 and the output driven gear 72 to the output shaft 62. The rotation of the output shaft 62 moves the associated motor vehicle in a reverse direction.

Figure 2:
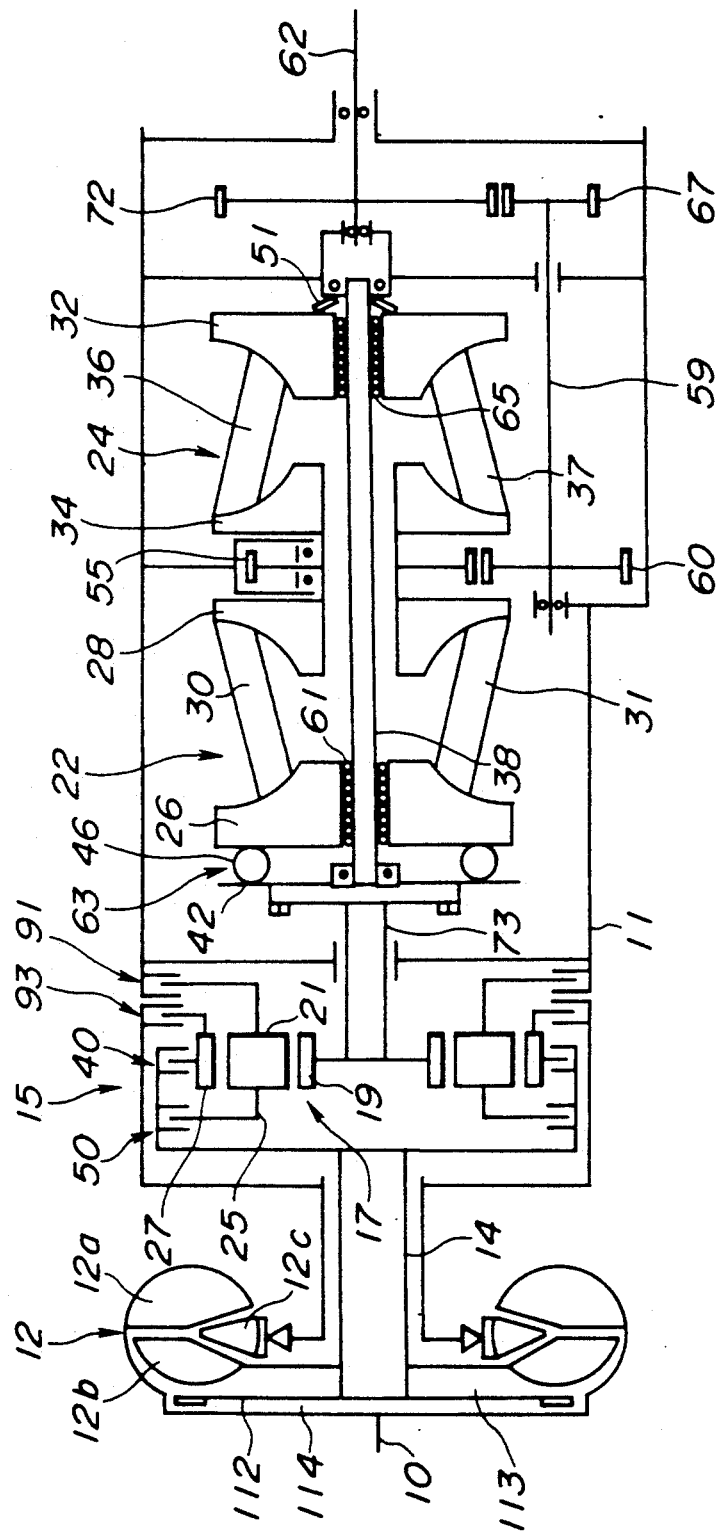
FIG. 2 is a view similar to FIG. 1, but showing a second embodiment of the present invention.

Referring to FIG. 2, there is shown a second embodiment of the present invention.

A torque from an engine crank shaft 10 is inputted to a torque converter 12 or a lock-up clutch 112. The torque converter 12 comprises a pump impeller 12a, a turbine runner 12b and a stator 12c. In accordance with a pressure difference between an apply-side hydraulic chamber 113 and a release-side hydraulic chamber 114, the lock-up clutch 112 can selectively engage and disengage the pump impeller 12a with and from the turbine runner 12b.

A turbine shaft 14 integral with the turbine runner 12b is connected to a speed increasing forward/reverse movement switching mechanism 15.

This mechanism 15 comprises a planetary gear mechanism 17, a forward clutch 40, a reverse clutch 50, a forward brake 91 and a reverse brake 93.

The planetary gear mechanism 17 comprises a sun gear 19, pinion gears 21 held by a pinion carrier 25, and an internal gear 27. Each pinion gear 21 is meshed with both the internal gear 27 and the sun gear 19. The sun gear 19 has a shaft 73 coaxially connected thereto.

The forward clutch 40 can connect the turbine shaft 14 with the internal gear 27, while, the reverse clutch 50 can connect the turbine shaft 14 with the pinion carrier 25. The pinion carrier 25 is connectable to a casing 11 through the forward brake 91, while, the internal gear 27 is connectable to the casing 11 through the reverse brake 93.

Within the casing 11 at a position downstream of the forward clutch 40, there are coaxially installed a first speed change mechanism 22 and a second speed change mechanism 24.

The first speed change mechanism 22 comprises an input disc 26, an output disc 28 and a pair of friction rollers 30 and 31 each being operatively interposed between the input and output discs 26 and 28. The input and output discs 26 and 28 have toroidal surfaces to which convex peripheries of the friction rollers 30 and 31 contact. By changing the angular position of each friction roller 30 or 31 relative to the input and output discs 26 and 28, the rotation speed change ratio between the input and output discs 26 and 28 is infinitely varied.

Similar to the first speed change mechanism 22, the second speed change mechanism 24 comprises an input disc 32, an output disc 34 and a pair of friction rollers 36 and 37 each being operatively interposed between the input and output discs 32 and 34. However, as is understood from the drawing, the arrangement of the input and output discs 32 and 34 of this second speed change mechanism 24 is opposite to that of the above-mentioned first speed change mechanism 22. That is, the output disc 28 of the first speed change mechanism 22 and the output disc 34 of the second speed change mechanism 24 are positioned close to each other.

The input disc 26 of the first speed change mechanism 22 is disposed through ball-splines 61 on a shaft 38 which is coaxially connected to the shaft 73. A cam flange 42 is arranged at a back side of the input disc 26. Between facing cam surfaces of the cam flange 42 and input disc 26, there are operatively disposed cam rollers 46. The cam rollers 46 are so shaped and arranged that, when the input disc 26 and the cam flange 42 make a relative rotation, the input disc 26 is biased toward the output disc 28. That is, the cam flange 42, the input disc 26 and the cam rollers 46 constitute a loading cam 63.

The input disc 32 of the second speed change mechanism 24 is disposed thorugh ball-splines 65 on the shaft 38. The input disc 32 is constantly biased toward the output disc 34 by a disc spring 51.

The output disc 28 of the first speed change mechanism 22 and the output disc 34 of the second speed change mechanism 24 are rotatably disposed about the shaft 38.

A forward/reverse drive gear 55 is provided between the two output discs 28 and 34 and rotates together with them. The forward/reverse drive gear 55 is meshed with a forward/reverse driven gear 60 which is securedly mounted on a front end of a countershaft 59.

The countershaft 59 is arranged in parallel with the shaft 38. The countershaft 59 has at its rear end an output drive gear 67. The output drive gear 67 is meshed with an output driven gear 72 which rotates together with an output shaft 62.

As is seen from the drawing, the turbine shaft 14, the shaft 73, the shaft 38 and the output shaft 62 are arranged on a common axis.

In the following, operation of the second embodiment of the present invention will be described.

For ease of understanding, the description will be commenced with respect to a forward drive condition wherein the forward clutch 40 and the forward brake 91 are in their engaged conditions and the reverse clutch 50 and the reverse brake 93 are in their disengaged conditions.

Under this forward drive condition, the engine torque from the crankshaft 10 is transmitted through the torque converter 12 (or the lock-up clutch 112), the turbine shaft 14 and the forward clutch 40 to the planetary gear mechanism 17. Upon this, the planetary gear mechanism 17 rotates the shaft 73 in an opposite direction at a speed higher than the turbine shaft 14. The rotation of the shaft 73 is transmitted through the shaft 38 to both the first and second speed change mechanisms 22 and 24. By these mechanisms 22 and 24, the rotation is subjected to a speed change and outputted to the forward/reverse drive gear 55. The rotation of the forward/reverse drive gear 55 is transmitted through the forward/reverse driven gear 60 to the countershaft 59 and then through the engaged output drive and driven gears 67 and 72 to the output shaft 62. The rotation of the output shaft 62 drives an associated motor vehicle in a forward direction at a desired speed.

It is now to be noted that the engine torque is lowered by the planetary gear mechanism 17 before being inputted to the first and second speed change mechanisms 22 and 24. That is, the planetary gear mechanism 17 serves as a so-called "torque lowering means". Thus, there is no need of increasing the torque receiving capacity of the first and second speed change mechanisms 22 and 24, unlike the case of the afore-mentioned former conventional transmission. Furthermore, provision of the planetary gear mechanism 17 induces no need of using an idler gear between the output drive and driven gears 67 and 72.

In a reverse drive condition, the forward clutch 40 and the forward brake 91 are in their disengaged conditions and the reverse clutch 50 and the reverse brake 93 are in their engaged conditions.

Under this reverse drive condition, the engine torque from the crank shaft 10 is transmitted through the torque converter 12, the turbine shaft 14, the reverse clutch 50, the pinion carrier 25, the pinion gears 21, the sun gear 19, the shaft 73, the shaft 38, the first and second speed change mechanisms 22 and 24, the forward/reverse drive and driven gears 55 and 60, the countershaft 59 and the output drive and driven gears 67 and 72 to the output shaft 62. Upon receiving the engine torque, the planetary gear mechanism 17 rotates the shaft 73 in the same direction at a speed higher than the turbine shaft 14. The rotation of the output shaft 62 moves the associated motor vehicle in a reverse direction.

As will be understood from the foregoing description, in the present invention, the planetary gear mechanism 17 is arranged to lower the engine torque applied to the two speed change mechanisms 22 and 24. Thus, there is no need of increasing the torque receiving capacity of the speed change mechanism 22 and 24. Furthermore, usage of the planetary gear mechanism 17 in the above-mentioned manner induces no need of using an idler gear between the output drive and driven gears 67 and 72. Accordingly, the transmission of the invention can be produced compact in size.

What is claimed is:

1. A continuously variable transmission comprising:
   torque transmitting means to which an engine torque is applied, said torque transmitting means being coaxially arranged on a first axis and having a first output shaft;
   a planetary gear mechanism which is coaxially arranged on said first axis and includes an internal gear, a sun gear, pinion gears operatively disposed between said internal gear and said sun gear and a pinion carrier carrying said pinion gears;
   a second output shaft connected to said sun gear to rotate therewith;
   a forward/reverse movement switching mechanism operatively interposed between said first output shaft and said planetary gear mechanism;
   a continuously variable type speed change device to which said second output shaft is connected, said speed change device being coaxially arranged on said first axis;
   a third output shaft coaxially arranged on said first axis;
   a countershaft coaxially arranged on a second axis which is in parallel with said first axis;
   first gear means for transmitting a torque from said speed change device to said countershaft; and
   second gear means for transmitting a torque from said countershaft to said third output shaft,
   wherein said forward/reverse movement switching mechanism is so arranged that when a forward drive condition is assumed by the transmission, the rotation speed of said second output shaft is higher than that of said first output shaft and the rotation direction of said second output shaft is opposite to that of said first output shaft and when a reverse drive condition is assumed by the transmission, the rotation speed of said second output shaft is higher than that of said first output shaft and the rotation direction of said second output shaft is the same as that of said first output shaft, and
   wherein each of said first and second gear means comprises a pair of gears which are mutually meshed with each other.

2. A continuously variable transmission as claimed in claim 1, in which said forward/reverse movement switching mechanism comprises:
   a forward clutch which, when engaged, connects said first output shaft to said internal gear;
   a reverse clutch which, when engaged, connects said first output shaft to said pinion carrier;
   a forward brake which, when engaged, connects said pinion carrier to a fixed member; and
   a reverse brake which, when engaged, connects said internal gear to said fixed member.

3. A continuously variable transmission as claimed in claim 1, in which said continuously variable type speed change device comprises:
   a first speed change mechanism coaxially arranged on said first axis; and
   a second speed change mechanism coaxially arranged on said first axis,
   wherein each of said first and second speed change mechanisms is of a toroidal disc type.

4. A continuously variable transmission as claimed in claim 3, in which each of said speed change mechanisms comprises:
   an input disc having a toroidal surface;
   an output disc having a toroidal surface; and
   a pair of friction rollers each being operatively disposed between the toroidal surfaces of said input and output discs.

5. A continuously variable transmission as claimed in claim 4, in which the respective output discs of said first and second speed change mechanisms are united and positioned close to each other and arranged in a back-to-back relationship.

6. A continuously variable transmission as claimed in claim 5, in which said first gear means comprises a drive gear which is coaxially connected to the united output discs of said first and second speed charge mechanisms and a driven gear which is coaxially connected to said countershaft and meshed with said drive gear.

7. A continuously variable transmission as claimed in claim 6, in which said second gear means comprises a drive gear which is coaxially connected to said countershaft and a driven gear which is coaxially connected to said third output shaft and meshed with said drive gear.

8. A continuously variable transmission as claimed in claim 7, in which said torque transmitting means includes a lock-up clutch.

* * * * *